Mar. 20, 1923.
G. W. R. HARRIMAN.
CHART.
ORIGINAL FILED JUNE 23, 1916.
1,448,961.
2 SHEETS—SHEET 1.
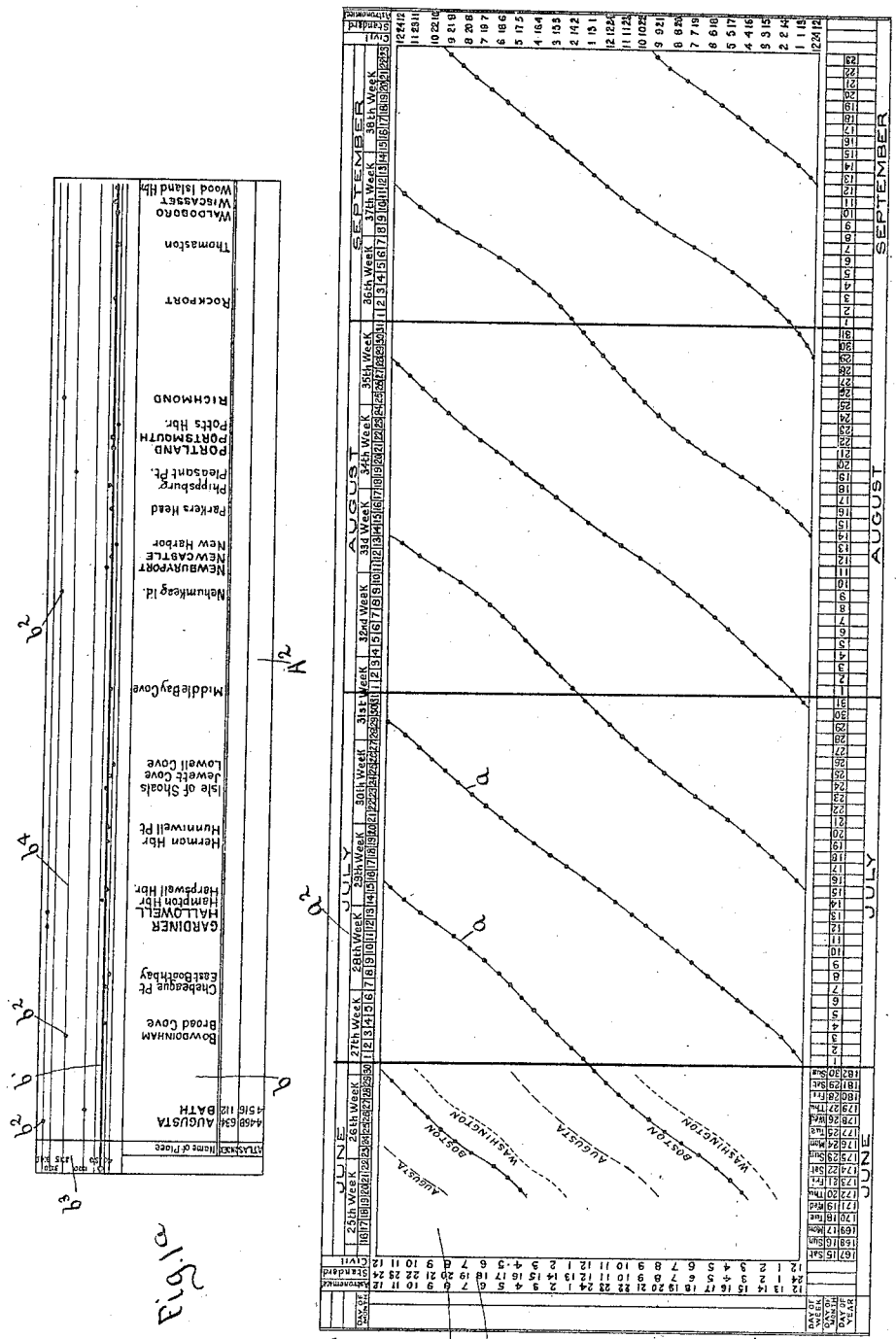

Mar. 20, 1923.                           1,448,961.
G. W. R. HARRIMAN.
CHART.
ORIGINAL FILED JUNE 23, 1916.
2 SHEETS—SHEET 2.
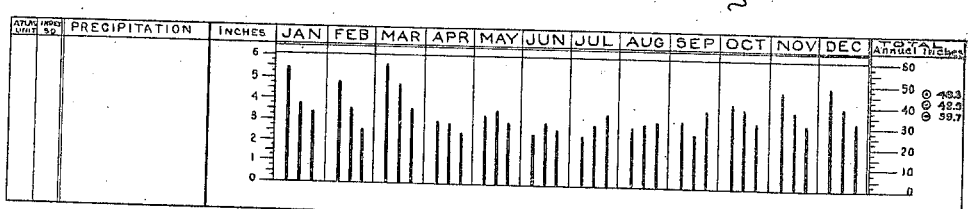

Patented Mar. 20, 1923.

1,448,961

UNITED STATES PATENT OFFICE.

GEORGE W. R. HARRIMAN, OF MALDEN, MASSACHUSETTS.

CHART.

Original application filed June 23, 1916, Serial No. 105,524. Divided and this application filed December 18, 1920. Serial No. 431,646.

*To all whom it may concern:*

Be it known that I, GEORGE W. R. HARRIMAN, a citizen of the United States, residing at Malden, in the county of Middlesex and State of Massachusetts, have invented new and useful Improvements in Charts of which the following is a specification.

It is the purpose of the present invention to furnish for the use of commerce and industry charts giving information of importance to such uses of which information time is an essential factor.

Explaining the foregoing general statement by reference to particular facts, I may say that among the factors of importance to manufacturers, merchants, investors, travelers and others are the times and conditions of tides at localities on tide water, the rainfall and temperature conditions in the different seasons of the year at various localities the times of dividend payments upon invested capital and of other periodical events in the conduct of business affairs using invested capital, the open and closed seasons for hunting, fishing, etc. in various localities; and in general all information in which points of time and points of locality are factors.

My invention may be considered generically as embodying a chart presenting, or adapted to present, information of this general nature by plots in terms of points of location on the earth's surface and points of time. This generic invention is illustrated in the present application with reference to certain charts designed to give different specific kinds of information; but this illustration is not intended to be a complete showing of all the forms which the invention may take or as limiting the scope of my protection otherwise than as such protection is defined by the appended claims.

The subject-matter of this invention was previously disclosed in my prior application for Letters Patent of the United States filed June 23, 1916, Serial No. 105,524, and the present is a division of said prior application.

In the drawings furnished with this specification to illustrate the invention, Figure 1 is a chart of tides plotted with reference to time points of the calendar year and of the days of the year, Figure 1$^a$ is a table of interpolations for specific localities. Figure 2 is a chart of investment information; Figure 3 a chart of information relating to sports; Figures 4 and 5 are charts of temperature and astronomical conditions; and Figure 6 is a chart of rainfall.

The chart A in Figure 1 contains plots $a$ giving the hours of a certain stage of the tide for successive days of the year at one or more base points. The stage so considered may be high tide or low tide or any other stage which may be required for the uses to which a specific chart based on these principles is put. The diagrams $a$ of the chart are plotted with reference to coordinates of which the ordinates $a'$ are in terms of units of time within the limits of a single day and the abscissæ $a^2$ are days of the calendar year. So much of the chart thus represents plots based on the points of absolute time.

The interpolation table $a^2$ gives the difference in time of the same stage of tide between different specific locations on tide water and the particular place for which the base diagram $a$ was plotted. In the interpolation table there is a column $b$ of place names, a base line $b'$, and points $b^2$ set opposite the respective place names and showing by reference to their distance from the base line $b'$ and their position, whether at one side or the other of said line, the length of time at which a given stage of the tide occurs before or after the occurrence of the same stage of the tide at the base point. A series of time indications is preferably provided at $b^3$ spaced from the base line $b'$ proportionately to the values of said time indications and lines $b^4$ parallel to the base line are projected therefrom to aid in determining the distances of the points $b^2$ from the base line.

If it be assumed that the lines $a$ plotted on chart A give stages of the tide at the base point, then interpolation in the values shown thereby, from the table A$^2$, enables the stage of the tide for any point in the series $b$ to be readily found for any day within the period of time for which the chart is plotted.

The chart shown in Figure 2 is designed to give specifically facts relating to corporations in terms of the times or dates on which the events plotted thereon take place.

Here the ordinates $c$ are the names of the corporations and the abscissæ $c'$ are points of time. It is considered that in this specific case the corporate names are equivalent to the locality names of other charts, inasmuch as the property of each corporation has a definite location, although the location (of a railroad company, for instance) may be a line and not a point.

The chart shown in Figure 3 gives other information with reference to location of ordinates $d$ and abscissæ $d'$ in points of time; and so also do the charts shown in Figures 4, 5 and 6, although these respective charts give different specific facts.

It will be noted from the foregoing explanation that each of the charts here shown provides a plot in which time points and place locations are coordinates; or in other words the absolute time points and definite locations are factors in the expression of information. These charts furnish graphically information concerning natural phenomena or operating or financial aspects of places and public utilities in easily appreciated sequence and correlation. By their use the interests of business and recreation are served.

What I claim and desire to secure by Letters Patent is:

1. A chart having information expressed thereon in diagrams plotted with reference to time points at which and the localities in which the events so indicated occur.

2. A chart of graphic representation of facts plotted with reference to coordinates which are, respectively, locations on the earth's surface and points of absolute time.

3. A chart representing in graphic form facts relating to specific localities, the facts so stated being plotted with reference to the designations of specific localities as ordinates and points of absolute time as abscissæ.

4. A tide chart having thereon plots of a stage of the tide throughout a series of days, the points of said plots being located with respect to times of the day and year and said chart including an interpolation table of place locations and the difference in time of the same stage of tide between such places and the base point with reference to which said plot is drawn.

5. A tide chart having plotted thereon points giving a stage of the tide at a base locality through a series of successive days in terms of the time of recurrence of such stage; together with an interpolation table having a base line and a series of names of places on tide water with points plotted with reference to said place names and base line, said points being distant from said line and at one side or the other thereof in proportion and according to the length of time which a given stage of tide occurs at the place designated before or after the occurrence of the same stage of tide at the base locality.

In testimony whereof I have affixed my signature.

GEORGE W. R. HARRIMAN.